(12) United States Patent
Wu et al.

(10) Patent No.: US 8,246,222 B2
(45) Date of Patent: Aug. 21, 2012

(54) LED DISPLAY ASSEMBLY AND ELECTRONIC DEVICE USING THE SAME

(75) Inventors: Zhi-Liang Wu, Shenzhen (CN); Hui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 290 days.

(21) Appl. No.: 12/790,884

(22) Filed: May 31, 2010

(65) Prior Publication Data

US 2011/0164427 A1 Jul. 7, 2011

(30) Foreign Application Priority Data

Jan. 4, 2010 (CN) .......................... 2010 1 0300026

(51) Int. Cl.
*F21V 15/00* (2006.01)

(52) U.S. Cl. ...................... 362/362; 362/97.3; 362/364
(58) Field of Classification Search ................. 362/97.2, 362/97.3, 362, 364
See application file for complete search history.

(56) References Cited

FOREIGN PATENT DOCUMENTS

| CN | 2870161 Y | 2/2007 |
|---|---|---|
| CN | 201611049 U | * 10/2010 |

* cited by examiner

*Primary Examiner* — David V Bruce
(74) *Attorney, Agent, or Firm* — Altis Law Group, Inc.

(57) ABSTRACT

An electronic reader includes a housing and an LED display assembly housed in the housing. The housing defines a hollow space and includes a recess. The LED display assembly includes an LED display panel, a film having a first surface and a second surface, a double-faced adhesive tape and a PCB fixed on the housing. The two surfaces of the double-faced adhesive tape are affixed on the PCB and first surface of the film respectively. The second surface of the film is affixed on the inner surface of the LED display panel. The hollow space is smaller than the LED display, and the recess is used for receiving the LED display panel.

16 Claims, 4 Drawing Sheets

LED DISPLAY ASSEMBLY AND ELECTRONIC DEVICE USING THE SAME

BACKGROUND

1. Technical Field

The present disclosure relates to an Lighting Emitting Diode (LED) display assembly and an electronic device using the same and, more particularly, to an electronic reader including an LED display assembly having a film that adheres to a display panel.

2. Description of Related Art

With the popularization of electronic devices such as electronic readers with an LED display assembly, providing a secure assembly of the display assembly to the electronic device is one of the important aspects in manufacturing such electronic devices. Usually, a double-faced adhesive tape is used to mount the LED display assembly to a circuit board of the electronic reader. Contaminants getting into the inner wall of the LED display assembly may give rise to the need for replacement of the display assembly from the circuit board. However, the LED display is difficult to detach from the electronic reader because of the adhesion of the adhesive tape.

Therefore, what is needed is an electronic device with an LED display assembly to alleviate the limitations described above.

DETAILED DESCRIPTION

Figure 1:
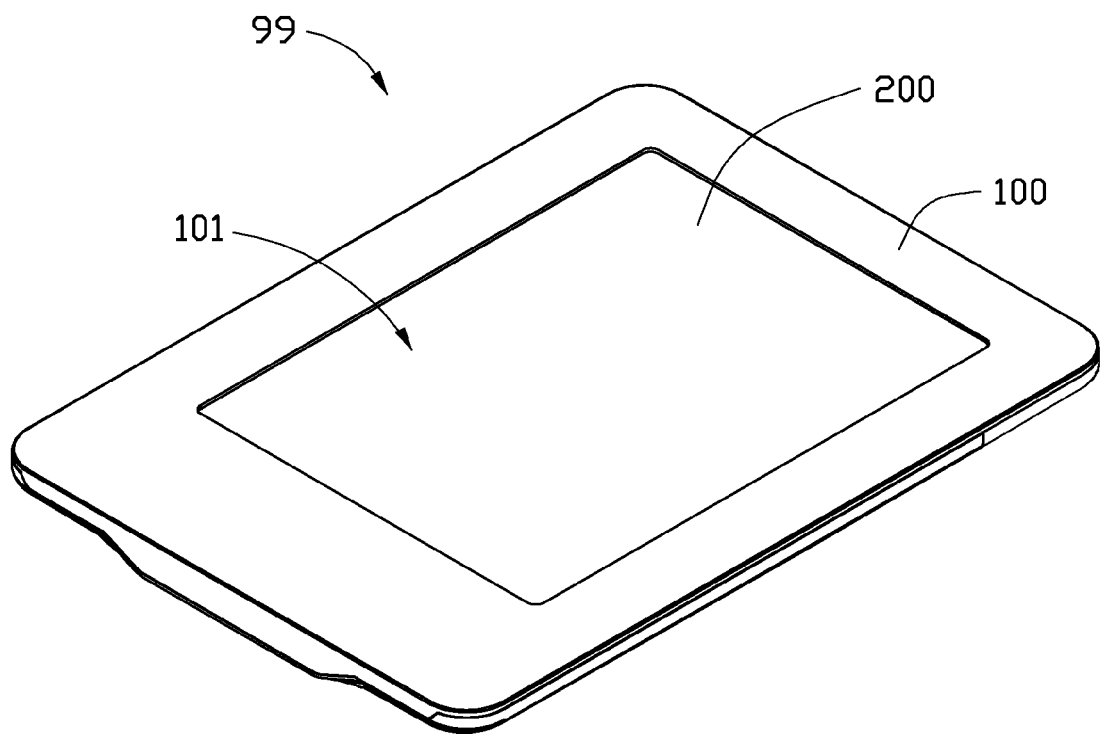
FIG. 1 is an isometric view of an exemplary embodiment of an electronic device with an LED display assembly.

Referring to FIG. 1, an electronic device 99 is disclosed as an exemplary embodiment. The electronic device 99 includes a housing 100 and an LED display assembly 200 seated in the housing 100. In the embodiment, the electronic device 99 can be an electronic reader.

Figure 2:
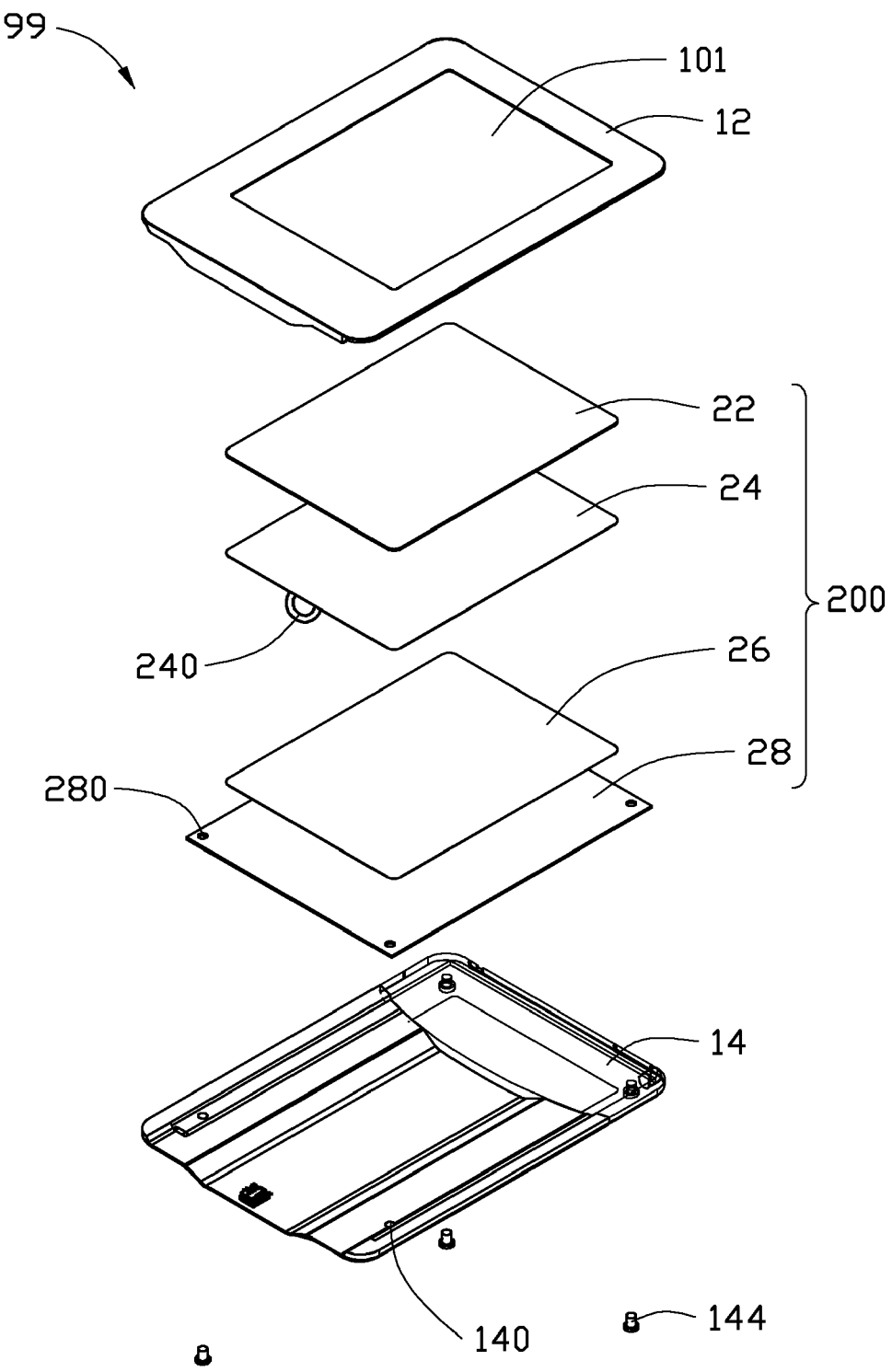
FIG. 2 is an exploded view of the electronic device of FIG. 1.
Figure 3:
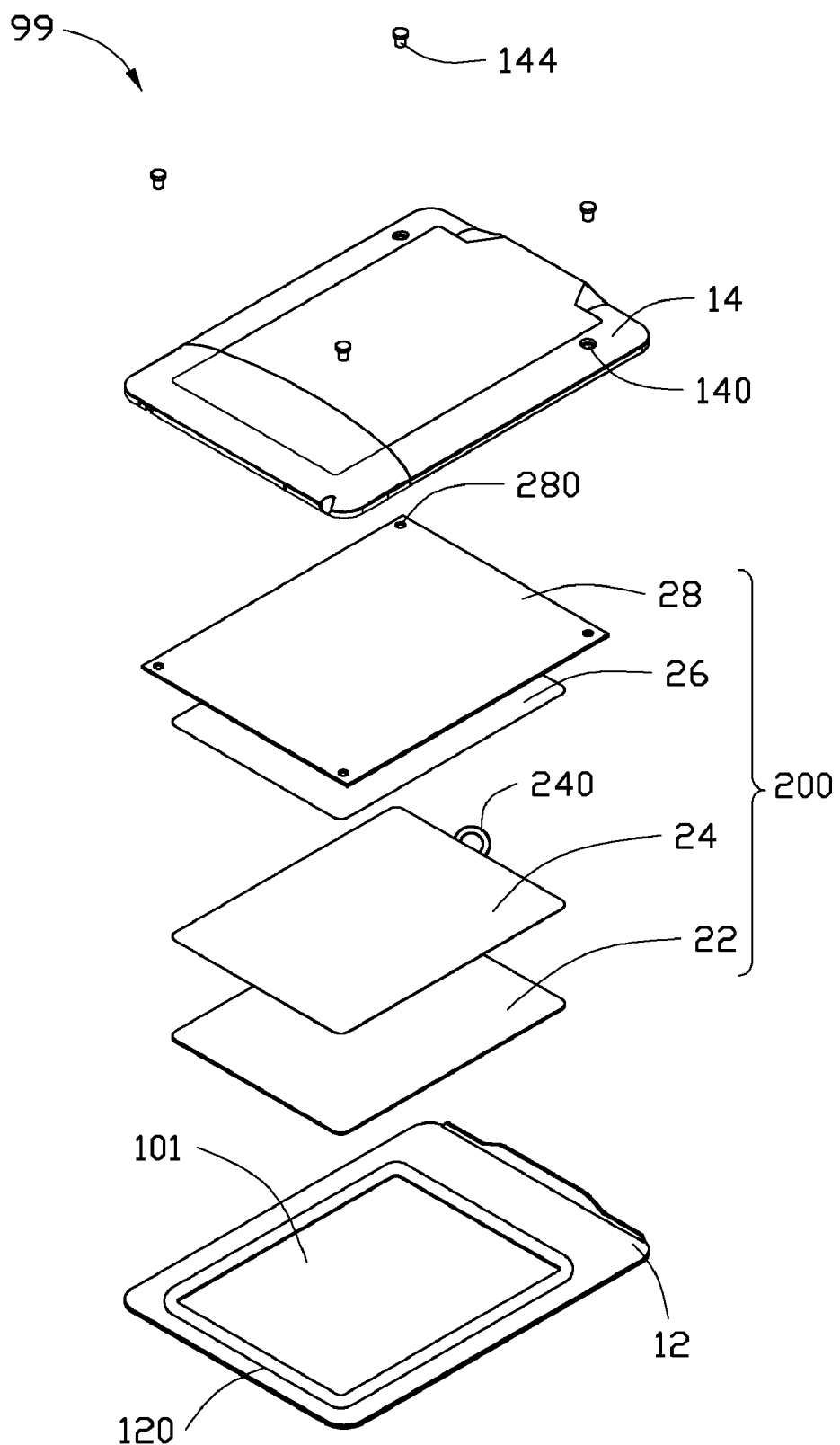
FIG. 3 is another exploded view of the electronic device of FIG. 1, viewed from another perspective.

Referring to FIGS. 2 and 3, the housing 100 includes an upper frame 12 and a base 14 connected to the upper frame 12. The upper frame 12 defines a hollow space 101. A recess 120 is formed on the inner surface of the upper frame 12 and extends around the hollow space 101. Four first through holes 140 are defined in the base 14.

The LED display assembly 200 includes an LED display panel 22, a film 24, a double-faced adhesive tape 26, and a printed circuit board (PCB) 28. The display panel 22 is exposed from the hollow space 101. The sizes and shapes of the LED display panel 22, the film 24 and the double-faced adhesive tape 26 are approximately the same. The recess 120 is used for receiving the LED display panel 22. A lug 240 protrudes from one edge of the film 24. In the embodiment, the film 24 is made of materials such as those commonly known as MYLAR or PET polyester that have excellent electrostatic adsorption ability. Four second through holes 280 are defined in the PCB 28 in the four corners.

In assembly, one side of the adhesive tape 26 is affixed to the PCB 28. The film 24 is affixed to the other side of the adhesive tape 26. Because of the lug 240, a user can easily affix the film 24 to the adhesive tape 26. That's to say, a user can hold an edge of the film 24 by pinching the lug 240 and lay the opposite edge of the film 24 on the adhesive tape 26, and than lay the whole film 24 on the adhesive tape 26 stepwise. To make sufficient contact between the film 24 and the adhesive tape 26, proper pressure may be applied to the film 24, enhancing adsorption force of the film 24. The LED display panel 22 is placed on the film 24. Because of the film 24 has excellent electrostatic adsorption ability, the LED display panel 22 is firmly attached to the film 24. In the whole process, auxiliary tools (not shown) may be used to keep proper alignment between the adhesive tape 26, the PCB 28, and the LED display panel 22. To make sufficient contact between the LED display panel 22 and the film 24, proper pressure may be applied to the LED display panel 22, enhancing adsorption force of the film 24.

Figure 4:
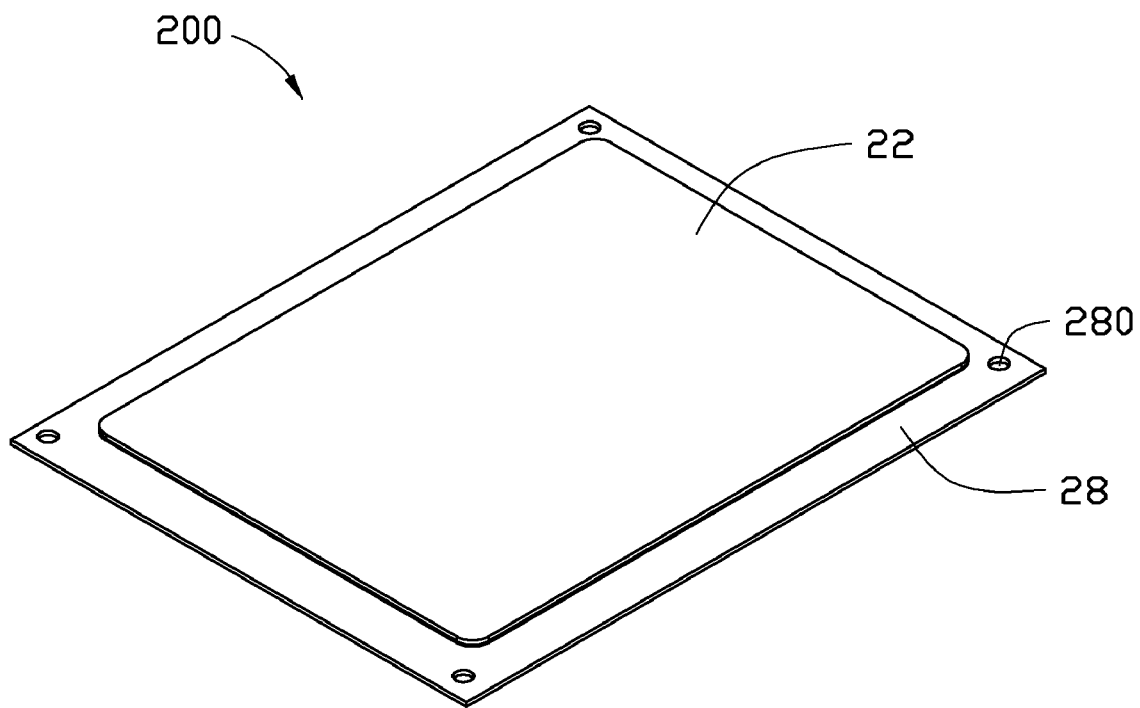
FIG. 4 is an isometric view of the LED display assembly of FIG. 1.

The assembled LED display assembly 200 (See FIG. 4) can be fixed on the base 14 via four screws 144 extending through the first through holes 140 and screwed in the second through holes 280. The subassembly is then connected to the upper frame 12 with the LED display panel 22 received in the recess 120, which further limits possible movements between the LED display panel 22 and the film 24.

In other embodiments, the electronic device 99 may be an electronic advertising board. The LED display panel 22 may not be easily damaged even if the electronic device 99 drops accidentally because the protection of the film 24 affixed firmly on the LED display panel 22. The LED display panel 22 can be easily detached from the electronic device 99 by detaching the film 24 from the double-faced adhesive tape 26. The LED display panel 22 will not be damaged because of the film 24.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An LED display assembly comprising:
    an LED display panel, a film having a first surface and a second surface, a double-faced adhesive tape and a printed circuit board (PCB); wherein the two surfaces of the double-faced adhesive tape are affixed on the PCB and the first surface of the film respectively, and the second surface of the film is affixed on an inner surface of the LED display panel.

2. The LED display assembly as described in claim 1, wherein the film is made of materials having electrostatic adsorption ability to provide absorbing force to absorb the LED display panel.

3. The LED display assembly as described in claim 1, wherein the sizes and shapes of the LED display panel, the film and the double-faced adhesive tape are approximately the same.

4. The LED display assembly as described in claim 1, wherein a lug protrudes from one edge of the film.

5. An electronic device, comprising:
    a housing defining a hollow space and comprising a recess around the hollow space; and
    an LED display assembly housed in the housing, comprising:
        an LED display panel, a film having a first surface and a second surface, a double-faced adhesive tape and a PCB fixed on the housing; wherein the two surfaces of the double-faced adhesive tape are affixed on the PCB and the first surface of the film respectively, and the second surface of the film is affixed on an inner surface of the LED display panel;

wherein the hollow space is smaller than the LED display, and the recess is used for receiving the LED display panel.

6. The electronic device as described in claim 5, wherein the film is made of materials having electrostatic adsorption ability to provide absorbing force to absorb the LED display panel.

7. The electronic device as described in claim 5, wherein the sizes and shapes of the LED display panel, the film and the double-faced adhesive tape are approximately the same.

8. The electronic device as described in claim 5, wherein a lug protrudes from one edge of the film.

9. The electronic device as described in claim 5, wherein the housing comprises an upper frame and a base fixed on the upper frame; the hollow space is defined in the upper frame; the recess is formed on an inner surface of the upper frame.

10. The electronic device as described in claim 9, wherein four first through holes are defined on the base, and four second through holes corresponding to the four first through holes respectively are defined in the PCB for fixing the PCB to the base.

11. An electronic reader comprising:
   a housing defining a hollow space and comprising a recess around the hollow space; and
   an LED display assembly housed in the housing, comprising:
      an LED display panel, a film having a first surface and a second surface, a double-faced adhesive tape and a PCB fixed on the housing; wherein the two surfaces of the double-faced adhesive tape are affixed on the PCB and the first surface of the film respectively, and the second surface of the film is affixed on an inner surface of the LED display panel;
   wherein the hollow space is smaller than the LED display, and the recess is used for receiving the LED display panel.

12. The electronic reader as described in claim 11, wherein the film is made of materials having electrostatic adsorption ability to provide absorbing force to absorb the LED display panel.

13. The electronic reader as described in claim 11, wherein the sizes and shapes of the LED display panel, the film and the double-faced adhesive tape are approximately the same.

14. The electronic reader as described in claim 11, wherein a lug protrudes from one edge of the film.

15. The electronic reader as described in claim 11, wherein the housing comprises an upper frame and a base fixed on the upper frame; the hollow space is defined in the upper frame; the recess is formed on an inner surface of the upper frame.

16. The electronic reader as described in claim 15, wherein four first through holes are defined on the base, and four second through holes corresponding to the four first through holes respectively are defined in the PCB for fixing the PCB to the base.

\* \* \* \* \*